(12) United States Patent
Huang et al.

(10) Patent No.: US 12,631,933 B2
(45) Date of Patent: May 19, 2026

(54) DISPLAY DEVICE

(71) Applicant: E Ink Holdings Inc., Hsinchu (TW)

(72) Inventors: Yen-Ze Huang, Hsinchu (TW);
Jen-Shiun Huang, Hsinchu (TW);
I-Feng Cheng, Hsinchu (TW);
Kuang-Heng Liang, Hsinchu (TW);
Ming-Huan Yang, Hsinchu (TW)

(73) Assignee: E Ink Holdings Inc., Hsinchu (TW)

( * ) Notice: Subject to any disclaimer, the term of this
patent is extended or adjusted under 35
U.S.C. 154(b) by 307 days.

(21) Appl. No.: 18/585,019

(22) Filed: Feb. 22, 2024

(65) Prior Publication Data

US 2024/0288743 A1 Aug. 29, 2024

(30) Foreign Application Priority Data

Feb. 24, 2023 (TW) ................................. 112106950

(51) Int. Cl.
*G02F 1/1679* (2019.01)
*G02F 1/167* (2019.01)

(52) U.S. Cl.
CPC ............ *G02F 1/1679* (2019.01); *G02F 1/167* (2013.01)

(58) Field of Classification Search
CPC ............................... G02F 1/1679; G02F 1/167
USPC ....... 359/237, 296; 430/32, 34, 38; 204/450, 204/600
See application file for complete search history.

(56) References Cited

U.S. PATENT DOCUMENTS 8,331,013 B2 * 12/2012 Hsiao ........................ H05K 3/40
359/296
2016/0103356 A1 4/2016 Shin et al.

2018/0275437 A1 9/2018 Nishiwaki et al.
2020/0004077 A1 1/2020 Lee et al.
2020/0357345 A1 11/2020 Cho et al.
(Continued)

FOREIGN PATENT DOCUMENTS

CN 101308264 11/2008
CN 112114449 12/2020
WO WO-2010073716 A1 * 7/2010 ......... G02F 1/13452

OTHER PUBLICATIONS

"Office Action of Taiwan Counterpart Application", issued on Mar. 21, 2024, p. 1-p. 6.

*Primary Examiner* — Tuyen Tra

(74) *Attorney, Agent, or Firm* — JCIPRNET

(57) ABSTRACT

A display device includes a driving substrate, a display medium layer, a protection assembly, a sealant layer, a driving chip, and a conductive substance. The driving substrate has a display area, a sealed area, and a peripheral area. The display medium layer is disposed in the display area of the driving substrate. The protection assembly is located on the display medium layer and includes a cover plate and a transparent conductive layer disposed on the cover plate. The sealant layer is disposed in the sealed area of the driving substrate to as least cover a periphery of the display medium layer. The driving chip is disposed in the peripheral area of the driving substrate. The conductive substance is disposed on the transparent conductive layer of the protection assembly. An orthographic projection of the conductive substance on the driving substrate overlaps the peripheral area of the driving substrate, and the transparent conductive layer is electrically connected with the driving substrate through the conductive substance.

10 Claims, 2 Drawing Sheets

(56)            References Cited

U.S. PATENT DOCUMENTS

| | | | |
|---|---|---|---|
| 2021/0020724 | A1 | 1/2021 | Cho et al. |
| 2021/0026482 | A1 | 1/2021 | Jeon et al. |
| 2021/0280826 | A1 | 9/2021 | Kim et al. |
| 2021/0349341 | A1 | 11/2021 | Lee et al. |
| 2021/0373696 | A1 | 12/2021 | Kim et al. |
| 2022/0140059 | A1 | 5/2022 | Kim et al. |
| 2022/0246712 | A1 | 8/2022 | Cho et al. |
| 2022/0342461 | A1 | 10/2022 | Jeon et al. |

* cited by examiner

DISPLAY DEVICE

CROSS-REFERENCE TO RELATED APPLICATION

This application claims the priority benefit of Taiwan application serial no. 112106950, filed on Feb. 24, 2023. The entirety of the above-mentioned patent application is hereby incorporated by reference herein and made a part of this specification.

BACKGROUND

Technical Field

The disclosure relates to an optoelectronic device, and in particular to a display device.

Description of Related Art

In the existing Electronic Paper Display (EPD) device, the metal pad for providing the voltage signal output by the lower plate to the transparent conductive layer of the upper plate is disposed in the sealed area. However, the disposed position of the metal pad not only occupies the wiring of the front plane laminate (FPL), but also occupies the border width of the chip side, so it cannot meet the current design requirements for display devices with slim borders.

SUMMARY

The disclosure provides a display device, which can reduce a border width to meet the design requirements of slim borders.

The display device of the disclosure includes a driving substrate, a display medium layer, a protection assembly, a sealant layer, a driving chip, and a conductive substance. The driving substrate has a display area, a sealed area, and a peripheral area, in which the sealed area surrounds the display area and is located between the display area and the peripheral area. The display medium layer is disposed in the display area of the driving substrate. The protection assembly is disposed in the display area, the sealed area, and the peripheral area of the driving substrate, and is located on the display medium layer. The protection assembly includes a cover plate and a transparent conductive layer disposed on the cover plate. The sealant layer is disposed in the sealed area of the driving substrate to at least cover a periphery of the display medium layer, and is located between the protection assembly and the driving substrate. The driving chip is disposed in the peripheral area of the driving substrate. The conductive substance is disposed on the transparent conductive layer of the protection assembly. An orthographic projection of the conductive substance on the driving substrate overlaps the peripheral area of the driving substrate, and the transparent conductive layer is electrically connected with the driving substrate through the conductive substance.

In an embodiment of the disclosure, the protection assembly further includes a water vapor barrier layer disposed between the cover plate and the transparent conductive layer.

In an embodiment of the disclosure, an edge of the cover plate, an edge of the water vapor barrier layer, and an edge of the transparent conductive layer are aligned.

In an embodiment of the disclosure, the protection assembly further includes a protection layer disposed on the cover plate, and the cover plate is located between the protection layer and the transparent conductive layer.

In an embodiment of the disclosure, the sealant layer is located between the protection layer and the driving substrate, and the sealant layer covers a periphery of a part of the cover plate.

In an embodiment of the disclosure, the display device further includes a flexible circuit board. The flexible circuit board is disposed in the peripheral area of the driving substrate, in which the flexible circuit board has a first portion, a second portion, and a bending portion connecting the first portion and the second portion. The driving substrate has an upper surface and a lower surface opposite to each other. The first portion is disposed on the upper surface, and the second portion is disposed on the lower surface.

In an embodiment of the disclosure, the display device further includes a printed circuit board disposed on the lower surface of the driving substrate and electrically connected with the second portion of the flexible circuit board.

In an embodiment of the disclosure, the display device further includes an adhesion layer disposed between the lower surface of the driving substrate and the printed circuit board. The printed circuit board is fixed on the driving substrate through the adhesion layer.

In an embodiment of the disclosure, the orthographic projection of the conductive substances on the driving substrate is located between an orthographic projection of the sealant layer on the driving substrate and an orthographic projection of the flexible circuit board on the driving substrate.

In an embodiment of the disclosure, the conductive substance is located at a side of the driving chip.

Based on the above, in the display device of the disclosure, the conductive substance is disposed on the transparent conductive layer of the protection assembly, and the orthographic projection of the conductive substance on the driving substrate overlaps the peripheral area of the driving substrate. That is to say, the conductive substance of the disclosure is located outside the sealed area, thereby effectively reducing the border design of the chip side, so that the display device of the disclosure has the advantages of slim borders and can meet the design requirements of slim borders.

In order to make the features and advantages of the disclosure more comprehensible, the following specific embodiments are described in detail together with the accompanying drawings.

DESCRIPTION OF THE EMBODIMENTS

The embodiments of the disclosure may be understood together with the drawings, and the drawings of the disclosure are also regarded as a portion of the disclosed description. It should be understood that the drawings of the disclosure are not drawn to scale and, in fact, the dimensions of elements may be arbitrarily enlarged or reduced in order to clearly represent the features of the disclosure.

Figures 1A, 1B:
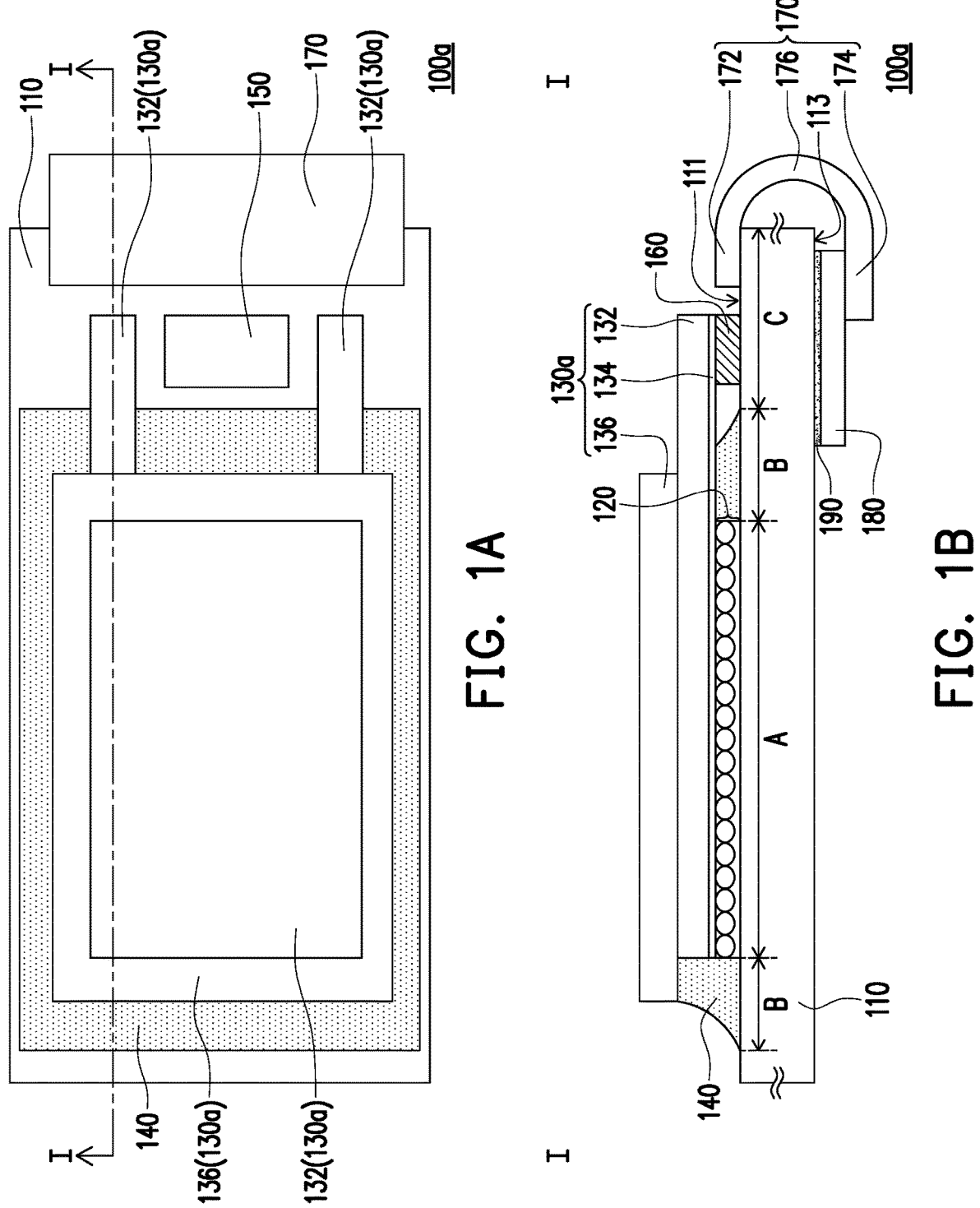
FIG. 1A is a schematic top perspective view of a display device according to an embodiment of the disclosure.
FIG. 1B is a schematic cross-sectional view along line I-I in FIG. 1A.

FIG. 1A is a schematic top perspective view of a display device according to an embodiment of the disclosure. FIG. 1B is a schematic cross-sectional view along line I-I in FIG. 1A. Please refer to FIG. 1A and FIG. 1B at the same time. In this embodiment, a display device 100a includes a driving substrate 110, a display medium layer 120, a protection assembly 130a, a sealant layer 140, a driving chip 150, and a conductive substance 160. The driving substrate 110 has a display area A, a sealed area B, and a peripheral area C, in which the sealed area B surrounds the display area A and is located between the display area A and the peripheral area C. The display medium layer 120 is disposed in the display area A of the driving substrate 110. The protection assembly 130a is disposed in the display area A, the sealed area B, and the peripheral area C of the driving substrate 110, and is located on the display medium layer 120. The protection assembly 130a includes a cover plate 132 and a transparent conductive layer 134 disposed on the cover plate 132, in which the transparent conductive layer 134 faces the display medium layer 120. The sealant layer 140 is disposed in the sealed area B of the driving substrate 110 to at least cover a periphery of the display medium layer 120, and is located between the protection assembly 130a and the driving substrate 110. The driving chip 150 is disposed in the peripheral area C of the driving substrate 110. The conductive substance 160 is disposed on the transparent conductive layer 134 of the protection assembly 130a. An orthographic projection of the conductive substance 160 on the driving substrate 110 overlaps the peripheral area C of the driving substrate 110, and the conductive substance 160 is located at a side of the driving chip 150 in the peripheral area C. The transparent conductive layer 134 is electrically connected with the driving substrate 110 through the conductive substance 160. Furthermore, the conductive substance 160 is electrically connected with a conductive terminal (not shown) on the driving substrate 110, and the conductive terminal is, for example, a metal pad.

In detail, in this embodiment, the display device 100a is embodied as a reflective display device, such as an electrophoretic display (EPD) device, but is not limited thereto. The driving substrate 110 is, for example, an active device array substrate, such as a thin film transistor (TFT) array substrate or a thin film diode (TFD) array substrate, but is not limited thereto. The display medium layer 120 is, for example, an EPD film or an electrowetting display film, but is not limited thereto.

As shown in FIG. 1A and FIG. 1B, the protection assembly 130a of this embodiment further includes a protection layer 136 disposed on the cover plate 132, the cover plate 132 is located between the protection layer 136 and the transparent conductive layer 134, and the cover plate 132 and the transparent conductive layer 134 thereon extend to outside of the sealant layer 140. The sealant layer 140 is located between the protection layer 136 and the driving substrate 110, and the sealant layer 140 covers the periphery of the display medium layer 120 and a periphery of a part of the cover plate 132. Here, an orthographic projection of the protection layer 136 on the driving substrate 110 is greater than and overlaps an orthographic projection of the display medium layer 120 on the driving substrate 110. The cover plate 132 and the transparent conductive layer 134 thereon extend from the display area A of the driving substrate 110 to the peripheral area C, and the conductive substance 160 is disposed on the transparent conductive layer 134 located in the peripheral area C. That is to say, the conductive substance 160 of this embodiment is located in the peripheral area C outside the sealed area B, but not in the sealed area B, and the conductive substance 160 is located at the side of the driving chip 150. A material of the transparent conductive layer 134 is, for example, indium tin oxide (ITO), but is not limited thereto. In an embodiment, an edge of the conductive substance 160, an edge of the protection assembly 130a, and an edge of the driving chip 150 are aligned.

It should be noted that the conductive substance 160 is, for example, conductive silver glue, which may provide the output voltage signal on the driving substrate 110 to the transparent conductive layer 134 of the protection assembly 130a. That is to say, the driving chip 150 on the driving substrate 110 outputs a voltage signal, which is provided to the transparent conductive layer 134 on the protection assembly 130a via the conductive substance 160. Thereby, it is convenient to control a voltage difference of the electric field when the display device 100a is driven, so that the display device 100a presents an image.

In addition, the display device 100a of this embodiment further includes a flexible circuit board 170. The flexible circuit board 170 is disposed in the peripheral area C of the driving substrate 110, in which the flexible circuit board 170 has a first portion 172, a second portion 174, and a bending portion 176 connecting the first portion 172 and the second portion 174. The driving substrate 110 has an upper surface 111 and a lower surface 113 opposite to each other. The first portion 172 of the flexible circuit board 170 is disposed on the upper surface 111, and the second portion 174 of the flexible circuit board 170 is disposed on the lower surface 113. At this time, the orthographic projection of the conductive substance 160 on the driving substrate 110 is located between an orthographic projection of the sealant layer 140 on the driving substrate 110 and an orthographic projection of the flexible circuit board 170 on the driving substrate 110.

Moreover, the display device 100a of this embodiment further includes a printed circuit board 180 disposed on the lower surface 113 of the driving substrate 110 and electrically connected with the second portion 174 of the flexible circuit board 170. In addition, the display device 100a of this embodiment further includes an adhesion layer 190 disposed between the lower surface 113 of the driving substrate 110 and the printed circuit board 180. The printed circuit board 180 is fixed on the driving substrate 110 through the adhesion layer 190.

Since the conductive substance 160 of this embodiment is disposed on the transparent conductive layer 134 of the protection assembly 130a, and the orthographic projection of the conductive substance 160 on the driving substrate 110 overlaps the peripheral area C of the driving substrate 110. That is to say, the conductive substance 160 of this embodiment is located outside the sealed area B, and placed on both sides of the driving chip 150, so that there is no need to reserve space for the conductive substance 160 in the sealed area B, and the space originally located at both sides of the driving chip 150 is used to place the conductive substance 160. In this way, a width of the display area A plus the sealed area B may be effectively reduced, and the border design on the chip side (that is, the area where the driving chip 150 is placed) may be further reduced, so that the display device 100a of this embodiment has the advantages of slim borders and can meet the design requirements of slim borders.

It should be noted here that the following embodiments follow the reference numerals and part of the content of the previous embodiments, where the same reference numerals are used to indicate the same or similar components, and descriptions of the same technical content are omitted. For the description of the omitting part, reference may be made to the above-mentioned embodiments, and will not be repeated in the following embodiments.

Figures 2A, 2B:
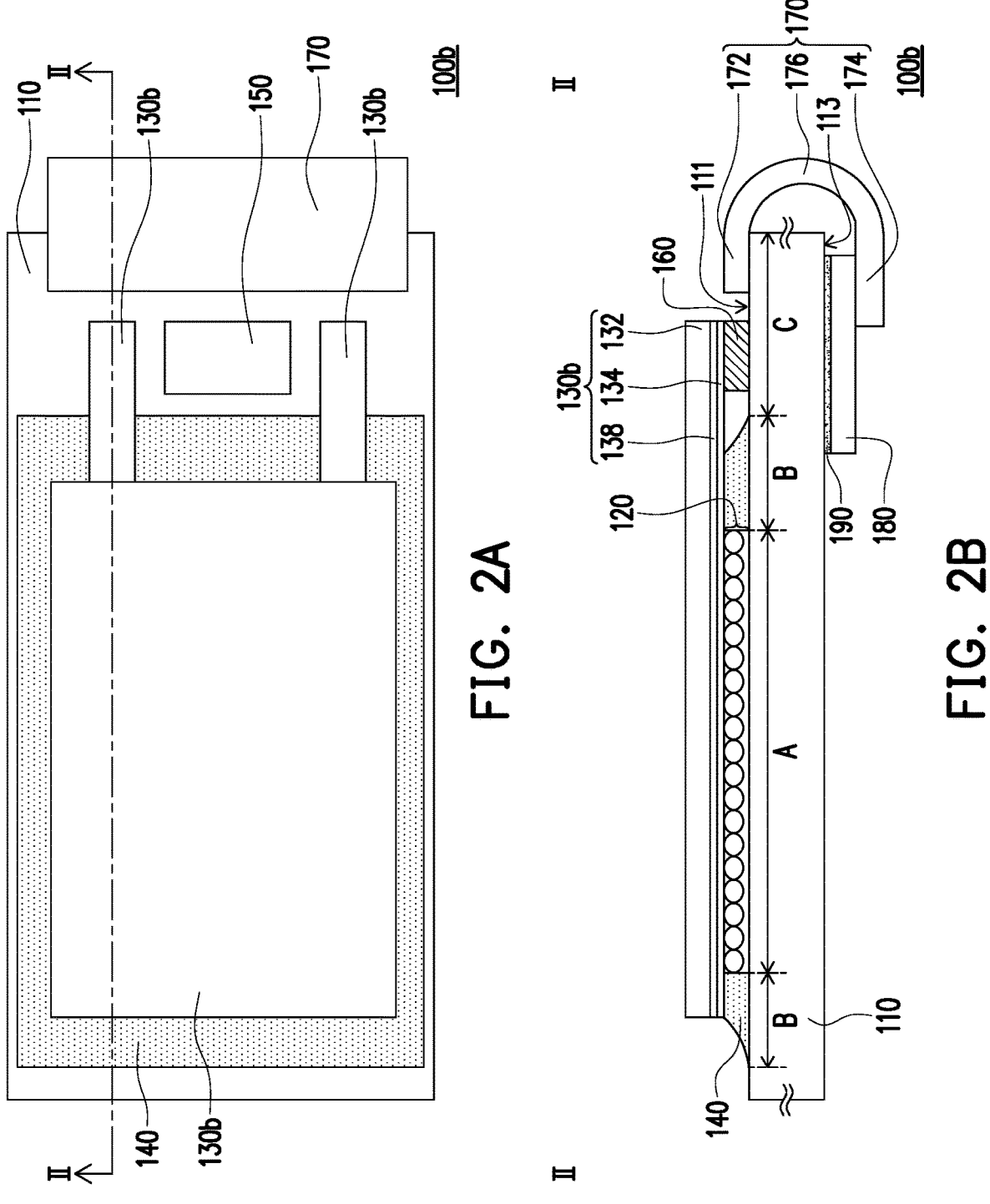
FIG. 2A is a schematic top perspective view of a display device according to another embodiment of the disclosure.
FIG. 2B is a schematic cross-sectional view along line II-II in FIG. 2A.

FIG. 2A is a schematic top perspective view of a display device according to another embodiment of the disclosure. FIG. 2B is a schematic cross-sectional view along line II-II of FIG. 2A. Please refer to FIG. 1A, FIG. 1B, FIG. 2A, and FIG. 2B at the same time. A display device 100*b* of this embodiment is similar to the display device 100*a*, and the difference between the two is that a structure of the protection assembly 130*b* of this embodiment is different from the protection assembly 130*a*. In detail, in the display device 100*b* of this embodiment, the protection assembly 130*b* further includes a water vapor barrier layer 138 disposed between the cover plate 132 and the transparent conductive layer 134. Here, an edge of the cover plate 132, an edge of the water vapor barrier layer 138, and an edge of the transparent conductive layer 134 are aligned. A thickness of the water vapor barrier layer 138 and the thickness of the transparent conductive layer 134 are much smaller than the thickness of the cover plate 132, in which a thickness of the water vapor barrier layer 138 and a thickness of the transparent conductive layer 134 are respectively, for example, 50 microns, but are not limited thereto.

In summary, in the display device of the disclosure, the conductive substance is disposed on the transparent conductive layer of the protection assembly, and the orthographic projection of the conductive substance on the driving substrate overlaps the peripheral area of the driving substrate. That is to say, the conductive substance of the disclosure is located outside the sealed area, thereby effectively reducing the border design on the chip side, so that the display device of the disclosure has the advantages of slim borders and can meet the design requirements of slim borders.

Although the disclosure has been disclosed above with the embodiments, the embodiments are not intended to limit the disclosure. Persons with ordinary knowledge in the technical field may make some changes and modifications without departing from the spirit and scope of the disclosure. The scope of protection of the disclosure should be defined by the appended claims.

What is claimed is:

1. A display device, comprising:
   a driving substrate having a display area, a sealed area, and a peripheral area, wherein the sealed area surrounds the display area and is located between the display area and the peripheral area;
   a display medium layer disposed in the display area of the driving substrate;
   a protection assembly disposed in the display area, the sealed area, and the peripheral area of the driving substrate, and located on the display medium layer, wherein the protection assembly comprises a cover plate and a transparent conductive layer disposed on the cover plate;
   a sealant layer disposed in the sealed area of the driving substrate to at least cover a periphery of the display medium layer and located between the protection assembly and the driving substrate;
   a driving chip disposed in the peripheral area of the driving substrate; and
   a conductive substance disposed on the transparent conductive layer of the protection assembly, wherein an orthographic projection of the conductive substance on the driving substrate overlaps the peripheral area of the driving substrate, and the transparent conductive layer is electrically connected with the driving substrate through the conductive substance.

2. The display device according to claim 1, wherein the protection assembly further comprises a water vapor barrier layer disposed between the cover plate and the transparent conductive layer.

3. The display device according to claim 2, wherein an edge of the cover plate, an edge of the water vapor barrier layer, and an edge of the transparent conductive layer are aligned.

4. The display device according to claim 1, wherein the protection assembly further comprises a protection layer disposed on the cover plate, and the cover plate is located between the protection layer and the transparent conductive layer.

5. The display device according to claim 4, wherein the sealant layer is located between the protection layer and the driving substrate, and the sealant layer covers a periphery of a part of the cover plate.

6. The display device according to claim 1, further comprising:
   a flexible circuit board disposed in the peripheral area of the driving substrate, wherein the flexible circuit board has a first portion, a second portion, and a bending portion connecting the first portion and the second portion, the driving substrate has an upper surface and a lower surface opposite to each other, and the first portion is disposed on the upper surface, and the second portion is disposed on the lower surface.

7. The display device according to claim 6, further comprising:
   a printed circuit board disposed on the lower surface of the driving substrate and electrically connected with the second portion of the flexible circuit board.

8. The display device according to claim 7, further comprising:
   an adhesion layer disposed between the lower surface of the driving substrate and the printed circuit board, wherein the printed circuit board is fixed on the driving substrate through the adhesion layer.

9. The display device according to claim 6, wherein the orthographic projection of the conductive substance on the driving substrate is located between an orthographic projection of the sealant layer on the driving substrate and an orthographic projection of the flexible circuit board on the driving substrate.

10. The display device according to claim 1, wherein the conductive substance is located at a side of the driving chip.

* * * * *